Patented Jan. 13, 1925.

1,522,697

UNITED STATES PATENT OFFICE.

CHARLES E. PARSONS, OF NEW YORK, N. Y., ASSIGNOR TO METAL RESEARCH CORPORATION, OF NEW YORK, N. Y., A CORPORATION OF DELAWARE.

PROCESS OF MAKING HIGH-GRADE GLASS.

No Drawing.     Application filed October 17, 1923. Serial No. 669,112.

*To all whom it may concern:*

Be it known that I, CHARLES E. PARSONS, a citizen of the United States, residing at New York, in the county of New York and State of New York, have invented certain new and useful Improvements in Processes of Making High-Grade Glass; and I do hereby declare the following to be a full, clear, and exact description of the invention, such as will enable others skilled in the art to which it appertains to make and use the same.

This invention relates to a process of making high grade glass from blast furnace slag, and has for its object to improve the procedures heretofore proposed.

With this and other objects in view, the invention consists in the novel steps and combinations of steps constituting the process, all as will be more fully hereinafter disclosed and particularly pointed out in the claims.

In order that the invention may be the more clearly understood, it is said:

It is well known that a typical furnace slag from a basic or steel making pig iron furnace burden has the following general composition:

| | Per cent. |
|---|---|
| Silica | 35 |
| Lime | 43 |
| Magnesia | 6 |
| Alumina | 13 |
| Sulphur | 2 |
| Manganese | 1 |

And it is a common practice in iron making to "granulate" this slag as it flows from the furnace,—that is, the stream of molten slag is run into such a large proportion of water that the slag is rapidly cooled and no dissociation of the latter occurs. It is also known that by this operation, the silicates and aluminates are more or less hydrated, and coarse crystallization is prevented.

It has been found by this invention that when such slag is ground to approximately 100 mesh and digested with a solution of silicate of sodium, a double decomposition occurs, producing insoluble calcium and magnesium silicates and a soluble sodium aluminate which may be separated out by filtration, and the alumina recovered by well known procedures in a state of exceptional purity. In carrying out the invention, it is preferable to make such digestion at high temperatures of from, say, 150° C. to 250° C., and in an autoclave, but the use of such high temperatures serves chiefly to increase the reaction velocity, and is not essential to this process. After the removal of the sodium aluminate solution, the filter residuum is treated for the recovery of the calcium and magnesium silicates. The mass of this residuum consists chiefly of such silicates in a light flocculent form, but there is also present more or less undigested slag, manganese silicates, etc. The flocculent and purified calcium and magnesium silicates are separated by agitating the whole mass in water, and passing the resulting suspension through any suitable well known pulp thickener, but preferably through a centrifugal separator. By this means the heavier undigested slag is separated from the light flocculent alkaline earth silicates, and these latter are dewatered by any suitable means such as a filter press. The end product consists of silicates of calcium and magnesium free from iron, and are of great value in making glass, for the alkaline earths being already in the form of silicates, the glass maker is not required to use in his melting pots the high temperature necessary to make alkaline earth metal silicates by direct fusion, as heretofore, and by this means, magnesium can be introduced into the glass melt at moderate temperatures, and thus enable the lowering of the expansion co-efficient of the glass.

After these magnesium and calcium silicates are thus obtained, in carrying out this invention, one proceeds to make up the regular glass charge by using said silicates of calcium and magnesium in the place of equivalent quantities of sand, lime, and magnesium carbonates, heretofore usually employed. Then to these said calcium and magnesium silicates is also added the usual quantities of the other constitutents that usually make up the glass charge, such as sodium sulphate, sodium carbonate, and a sufficient quantity of silica to supply the deficiency of silica carried by said calcium and magnesium silicates.

What is claimed is:

1. The process of making glass from blast furnace slag which consists in finely dividing said slag; digesting the finely divided slag with a solution of an alkali metal silicate to form calcium and magnesium silicates; separating out said calcium and magnesium silicates; adding to the latter such other constituents as are necessary to complete a desired glass making charge; and causing the constituents of the completed charge to react to form the desired glass.

2. The process of making glass from blast furnace slag which consists in finely dividing said slag; digesting said finely divided slag with a solution of sodium silicate to form calcium and magnesium silicates and sodium aluminate; separating out said calcium and magnesium silicates; adding to said calcium and magnesium silicates such constituents as are necessary to complete the desired glass making charge; and forming the glass from the charge material thus provided.

In testimony whereof I affix my signature.

CHARLES E. PARSONS.